J. W. Howlett,
Changing Speed
Nº 31,978.    Patented Apr. 9, 1861.

Witnesses;
J. W. Coonly
R. S. Spencer

Inventor;
J. W. Howlett
by Munn & Co.
Attys

UNITED STATES PATENT OFFICE.

J. W. HOWLETT, OF GREENSBORO, NORTH CAROLINA.

TRANSMITTING MOTION.

Specification of Letters Patent No. 31,978, dated April 9, 1861.

*To all whom it may concern:*

Be it known that I, J. W. HOWLETT, of Greensboro, in the county of Guilford and State of North Carolina, have invented a new and Improved Mode of Transmitting Motion; and I do hereby declare that the following is a full, clear, and exact description thereof, reference being had to the accompanying drawings, making part of this specification, in which—

Figure 1:
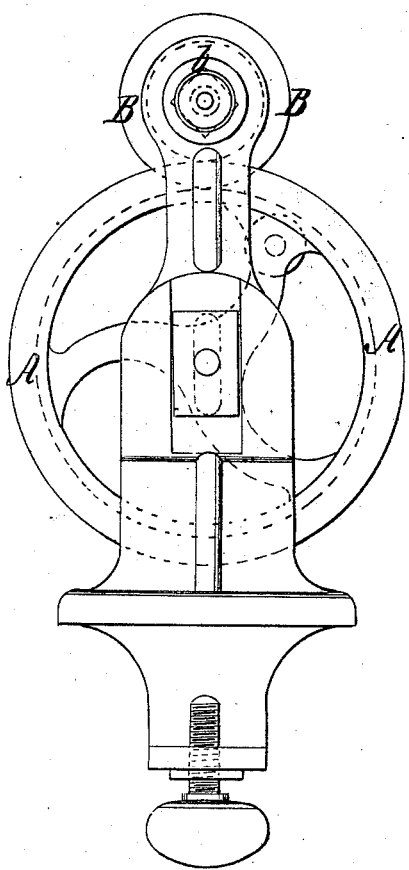
Figure 2:
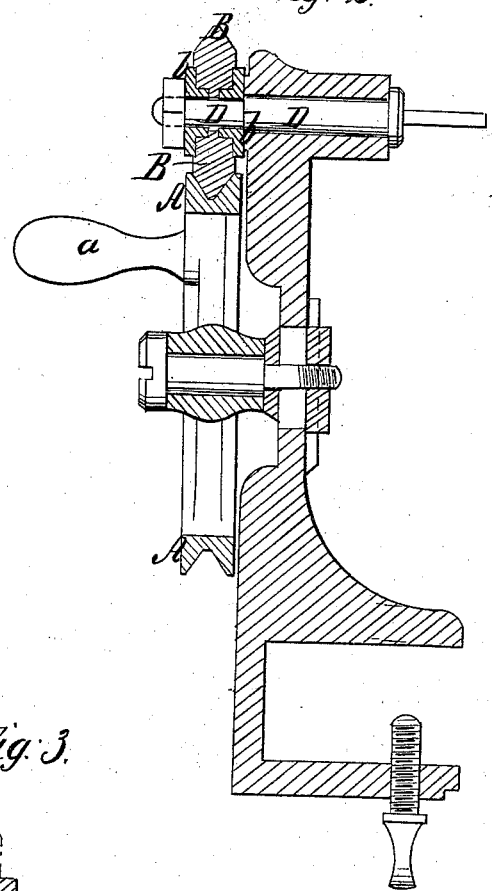
Figure 3:
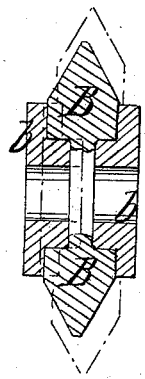

Figure 1, is an elevation of a drilling machine, in which my improved rubber wheel is applied. Fig. 2, is a vertical transverse section taken through Fig. 1, showing the wheel in section. Fig. 3, shows the manner of increasing the diameter of the improved wheel.

Similar letters of reference indicate corresponding parts in the three figures.

To enable those skilled in the art to make and use my invention I will proceed to describe its construction and operation.

The drawings represent the invention applied to a bench drill merely for the purpose of illustrating one instance of its adaptation to a spindle and grooved wheel but it is more especially intended for sewing machines.

A, is a grooved wheel which in the present instance is the driving wheel or the one to which the motive power is applied by means of a handle *a*. The groove in the wheel A, need not necessarily be made angular. It may be very gently curved or it may be very acute.

B, is a wheel made of india rubber, gutta percha, or other like substance, having a double-beveled edge or a rounded edge corresponding to the groove that is made in the circumference of the wheel A, into which groove the peripheries of the rubber wheel B fit. This rubber wheel B, has two circular flanged plates *b*, *b*, placed on each side of it, the necks of which pass into a hole made through the wheel B; these collars with their wheel are placed on the arbor or spindle D, and the two collars are confined against the wheel by screw nuts or a fixed collar and one nut and the wheel is thus secured to the shaft and prevented from turning on the shaft. The diameter of the rubber wheel B should be slightly less than that of a circle produced from the axis of the spindle D, touching the periphery of the wheel A, so that when the wheel B is on the shaft D, it will be necessary to clamp the collars *b*, *b*, closely to it to make it touch the wheel A, which by so doing the wheel B will be secured to its spindle at the same time the least amount of rolling friction between the two wheels A, B, will be produced. Thus in order to increase this friction the collars or clamping plates *b*, *b*, are set closer together, which operation will increase the diameter of the wheel B. It will thus be seen that the diameter of the wheel B, may be increased or diminished at pleasure and according as it is increased or diminished in diameter so will the friction between the two wheels A, B, be increased or reduced. This same result will be obtained whether the compressible wheels be large or small.

I am aware that friction wheels have been made of india rubber, gutta percha and other like substances, but I lay no claim to the employment of such, irrespective of the manner in which I use them.

I therefore claim as new and desire to secure by Letters Patent—

The employment in transmitting motion from one wheel to another of a beveled elastic wheel, constructed and arranged upon its shaft, with compressing collars, in the manner herein shown and described so that the diameter of said elastic wheel may be increased or diminished at pleasure, and the transmission of the power may be thus regulated as desired, all as set forth.

J. W. HOWLETT.

Witnesses:
W. C. DONNELL,
JOHN F. HOWLETT.